June 11, 1929.  F. POPPENSIEKER  1,716,532
MULTISPINDLE TURRET LATHE
Filed Jan. 13, 1927    4 Sheets-Sheet 4

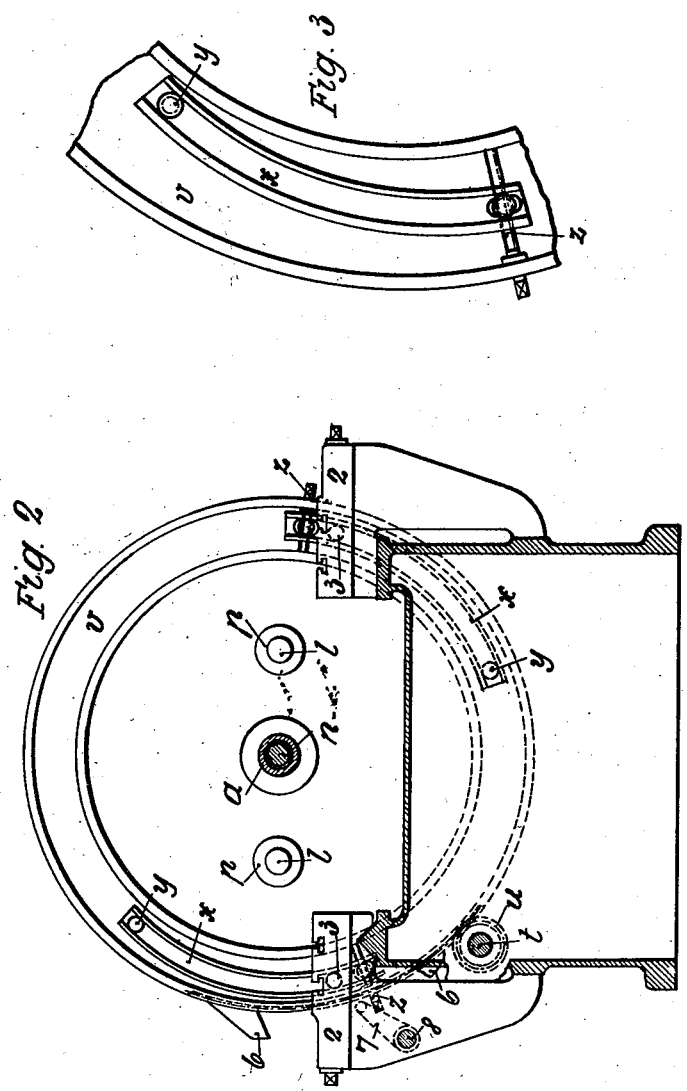

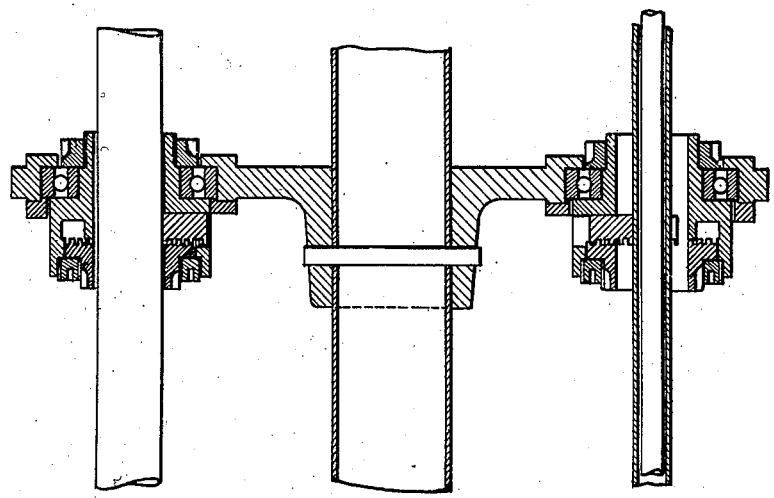
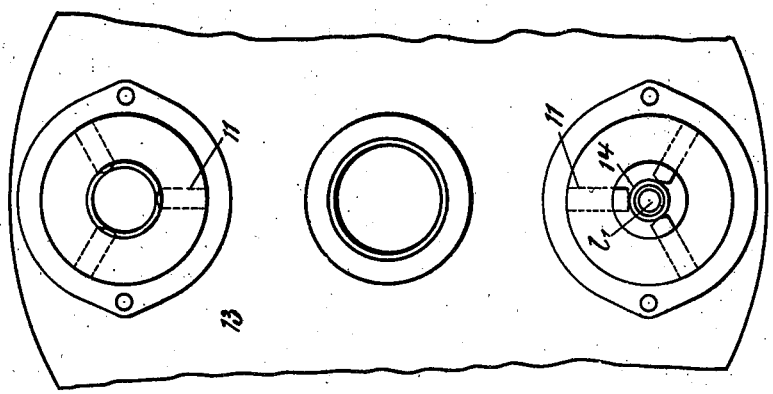
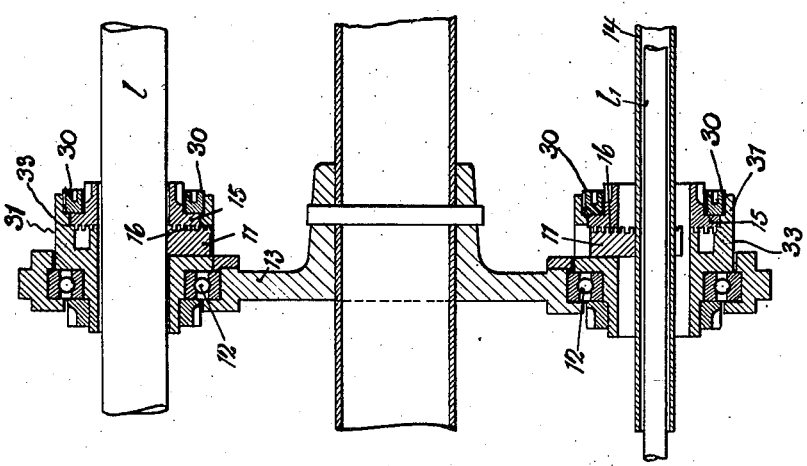

Inventor:
Fritz Poppensieker
BY Ruegg, Boyer & Bakeler
ATTORNEYS.

Patented June 11, 1929.

1,716,532

UNITED STATES PATENT OFFICE.

FRITZ POPPENSIEKER, OF COLOGNE, GERMANY, ASSIGNOR TO ALFRED H. SCHÜTTE, OF COLOGNE-DEUTZ, GERMANY, A COMPANY OF GERMANY.

MULTISPINDLE TURRET LATHE.

Application filed January 13, 1927, Serial No. 160,854, and in Germany December 11, 1925.

This invention concerns improvements in or relating to multi-spindle turret-lathes of the type provided with a stationary workholder, a main tool-slide which is driven by a spindle axially of the work, that is of the length or bar of material to be operated upon, and lateral slides moved transversely to the length of the material. With such lathes difficulties are frequently encountered due to tipping of the tool-slide resultant on the reaction pressure on the tools. This has a detrimental effect not only on the whole machine and driving means thereof but also, and above all, on the tools and work.

In the machine according to the present invention, one object of which is to obviate the disadvantages mentioned, firstly the cutting pressure of all the tools is taken up by the threaded spindle of the tool slide in which the former is arranged axially and in the middle, and secondly the pressure at the end of the movement of the tool slide is taken up by a stop mounted on the threaded spindle. In consequence all pressures exerted on the movable tool-slide are taken up centrally and tipping of the main tool-slide is avoided. Due to the uniform and exact feed movement the cutting points or edges remain in their prescribed positions relatively to the work and wear out less rapidly than was hitherto the case. As a result less time is lost in replacing and readjusting the tools and fewer tools are used up.

The invention is illustrated by way of example in the accompanying drawings in which:

Fig. 1 is a longitudinal section of one embodiment of the invention,

Fig. 2 a cross-section on the line II—II in Fig. 1,

Fig. 3 a detail view on a larger scale of a portion of the machine as shown in Fig. 2, Fig. 4 is a sectional elevation to a larger scale of the means at the left hand end of Figure 1 for holding and guiding the work.

Fig. 5 a front elevation thereof,

Figure 9 is a sectional elevation corresponding to Figure 4 but showing the means at the right hand end of Figure 1 for holding and guiding the work.

Figure 1:
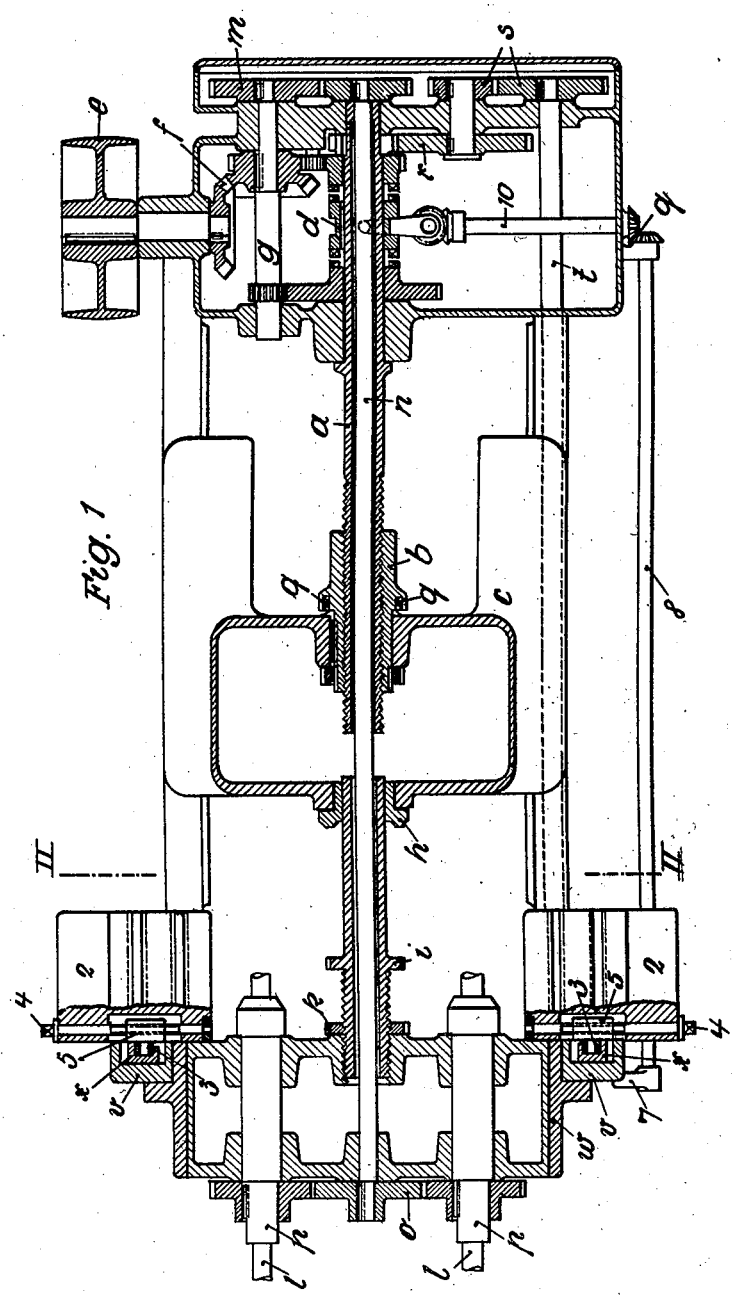

Referring to Figs. 1–3 of the drawings the tubular threaded spindle $a$ on which is mounted an internally threaded member or sleeve $b$ moves, on being rotated, the main tool slide $c$ in an axial direction and is driven itself in known manner by a change-speed clutch $d$ in such a manner that the tool slide performs a slow forward movement and a rapid backward movement. The spindle $a$ is disposed in the main tool slide precisely at the centre of the tool circle and takes up therefore the reaction-pressures of all the tools mounted on the slide $c$ so that tipping or tilting thereof is impossible. The threaded spindle derives rotation from the pulley $e$ which drives through bevel wheels $f$, a shaft $g$ and suitable pinions, the double clutch member $d$ of the change speed gear which is splined to the threaded spindle $a$, whereby the latter is driven in one or the other direction depending on whether the clutch is engaged to the left or right. As the tool slide $c$ in its slow forward movement approaches its forward end-position a central boss $h$ provided thereon comes into contact with a stop $i$ which is arranged co-axially with the threaded spindle, the slide being thus brought to an immediate standstill. In contradistinction to previously known multi-spindle automatic lathes in which the tool slides were liable to tip at the termination of the movement on account of the lateral position of the stop, thus causing the termination of the movement of the various tools mounted in the tool slide to be irregular, in the machine according to the present invention the central arrangement of the stop is of substantial importance since, due to the pressure being wholly taken up centrally, no tipping or tilting can occur and the movements of all the tools terminate in an exactly uniform manner. By the provision in association with the stop $i$ of a thread which engages with a nut $k$, the stop is rendered accurately adjustable in the axial direction so that it may be set to become operative at or shortly before the instant, depending on the length of the work, at which the return movement of the tool is to commence.

The work, that is the rods or bars of material $l$, is rotated in the following manner:

A shaft $n$ which passes axially through the hollow threaded spindle $a$ is rotated from the pulley $e$ through the bevel-wheels $f$ and pinions $m$. The forward end of the shaft $n$ drives, through pinions $o$, the work-spindles $p$ in which the work in the form of rods or bars is secured. When, with the method of terminating the movement described, the stop has made contact, the articles being worked rotate a certain amount further while the tools, since the slide is retained by the stop, do not progress further. In order that the movement may terminate quietly without breakage of the gear or damage to the tools or the work, the sleeve $b$ on the spindle is not rigidly secured to the tool slide $c$, one or more compression springs being introduced in compression between the two said members. On the termination of the movement the spindle $a$ tends to move the sleeve $b$, mounted thereon, in the axial direction, the springs $q$ thus being compressed. The sleeve is in consequence moved into the stationary slide $c$ to the extent required by the termination of the movement. The occurence of excessive forces and the possibility of breakage are obviated in this manner.

As in the case of the axially movably main tool-slide, the transmission of the pressure on the transverse slides movable perpendicularly to the longitudinal axis is arranged to be exactly central. To this end the threaded spindle $a$ drives, through the pinions $r$, exchangeable gears $s$, shaft $t$ and driver $u$ (Fig. 2), a ring $v$ which is mounted on the casing of the head-stock so as to be capable of rotation about the axis of the threaded spindle. Guide bars $x$, each oscillable about a pivot $y$, are arranged in the ring $v$, the ends of the bars being adjustable to different degrees of eccentricity relative to the axis of the ring $v$ by means of adjusting screws $z$. The transversely movable lateral slides 2 are thus moved radially with relation to the ring $v$ by these bars $x$, a roller 3 mounted on each lateral slide engaging in a groove in the guide bar. As the driving ring $v$ rotates backwards and forwards the lateral slides 2 are moved radially backwards and forwards. Two lateral slides only are illustrated in the drawings but a larger number of lateral slides may be disposed uniformly radially around the ring. Each of the guide-rollers 3 is mounted on a sliding member 5 adjustable in the lateral slide by means of a screw 4, this enabling the tool to be exactly adjusted. The amplitude of movement of the lateral slide may be adjusted at will by swinging the guide bar $x$ by means of the adjusting screw $z$.

A projection 6, on the circumference of the ring $v$ actuating the lateral slides contacts towards the end of the angular movement thereof with the lever 7 and thereby, through the intermediary of the shaft 8, bevel wheels 9 and shaft 10, moves the clutch $d$ of the change speed gear so that the rapid return movement replaces the slow forward movement. Shortly before the machine is automatically changed over to the rapid return movement in this manner the central stop surfaces $h$, $i$ for the main tool-slide come into contact with each other, as described above, so that at the end of each operation the work may come to rest before the rapid return movement commences. Towards the end of the latter movement the projection 6 effects the gear change back to operative movement. By employing gear-wheels of different gear ratio in the gear $s$ the longitudinal movement of the main slide $c$ may be adapted to the particular length to be turned or bored without variation of the angular rotation of the driving ring $v$ or of the transverse movement of the lateral slides.

Tipping or tilting of any of the operative parts of the multi-spindle lathe are obviated by the central transmission of the pressures, this applying as has been shown not only to the main tool slide but also to the lateral slides. The levers and pivots employed hitherto with a cam drive for the movement of the lateral slides always caused an irregular feed movement due to their liability to bend and twist.

In the automatic machine-tool according to the present invention it is very important that the automatically-fed bars or rods of material should be so mounted and guided that in spite of the high turning speed they do not deform under the centrifugal force, cause no noise and are, nevertheless readily replaceable. Means for guiding the material so as to achieve the ends stated are illustrated by way of example in Figs. 4 and 5 in association with a turret-lathe wherein six rods $l$, $l_1$ ..... distributed uniformly around the circle are passed through the turret like rotary disc 13. The rod $l$, when of comparatively large diameter (upper part of Fig. 4) is gripped at definite intervals by three-jaw chucks 11 of which the jaws are radially adjustable and securable in such a manner that the rod although exactly centered is able to move in the longitudinal direction relatively to the chuck 11. The three-jaw chucks are mounted in the rotary disc 13 in ball-bearings 12 so as to be easily rotatable. Deformation under centrifugal force on turning of the rod is impossible on account of the exact centering.

If the rod of material is of small diameter, as is the case of the lower rod $l_1$ illustrated, the three-jaw chuck 11, which is readily rotatable in the ball bearing, grips a tube 14 in which the rod $l_1$ is disposed with a slight amount of play. On the rapid rotation of the rod the tube is entrained by the friction, that is it takes part in the rotation, prevents deformation under centrifugal force and minimizes noise. On account of the arrangement of the three-jaw chuck the tube 14 is readily exchangeable so that the appropriate tubes for rods of various diameters can always be set up.

In both of the arrangements described the noise hitherto caused by known rod-guides is obviated.

In order to center the rod of material or the guide-tube 14 exactly in the chuck, the ring-nut 30 which secures the collar 15 against rotation is unscrewed until it is brought slightly outside of the body 31 which rests upon the ball bearings 12. In this way the collar 15, which is provided with a face thread 16, is set free and can be rotated. By means of this turning of the collar 15, which rests on a shoulder 33 of the body 31, the jaws 11 which are provided with projecting teeth in mesh with the face-winding thread 16 are moved forward in the corresponding grooves of the body 31. The turning of the collar 15 is continued until the jaws 11 have come up against the rod of material 1 in such manner that the latter can glide exactly centrally between the jaws. By the use of a guide tube 14 it becomes practicable for the jaws 11 to be turned until they press close up against the stationary tube 14 and thus center the latter. Then the previously released ring-nut 30 is again screwed into the body 31 so that the ring nut 30 presses close against the collar 15 and secures it against rotation. In this manner radial shifting of the jaws 11 due to vibration of the rods is obviated.

Figure 6:
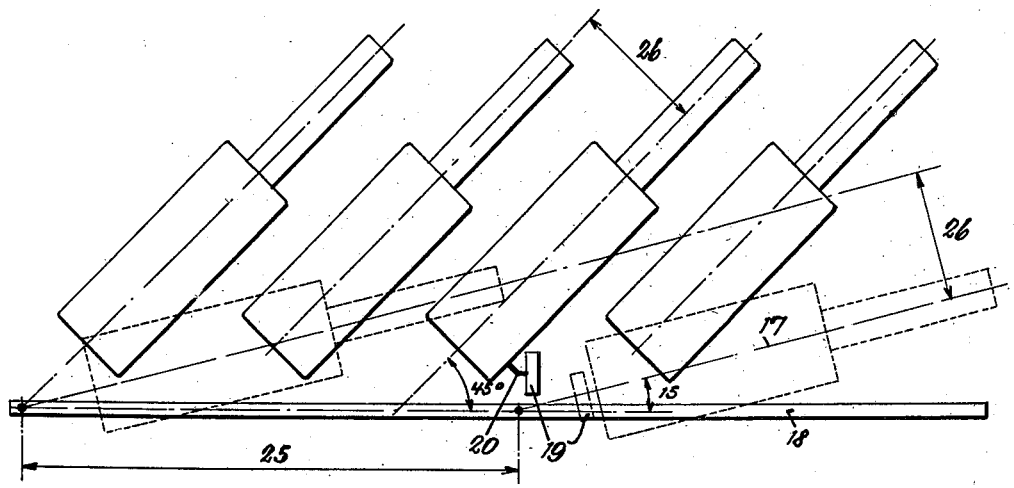
Fig. 6 is a diagrammatic view of the arrangement of a number of lathes relatively to the transmission shaft and Figs. 7 and 8 are sectional views at right angles to each other of driving means for a lathe.

Such turret lathes for working material in rod form were hitherto, when driven from a common transmission shaft, usually arranged in the manner indicated with dotted lines in Fig. 6. The central axes 17 of the lathes were inclined at a slight angle, 15° as a maximum, to the axis of the transmission shafting. The work operated on by one lathe was thus disposed behind and to one side of the neighbouring machine. It was not possible materially to exceed 15° because the twisting of the belt running on the lathe-pulley 19 would have been too great and the arc over which the belt contacted with the pulley too small. Furthermore twisting results in one sided stretching of the belt whereby efficiency is lost since the belt, after stretching, no longer bears on the whole of the pulley.

Figure 7:
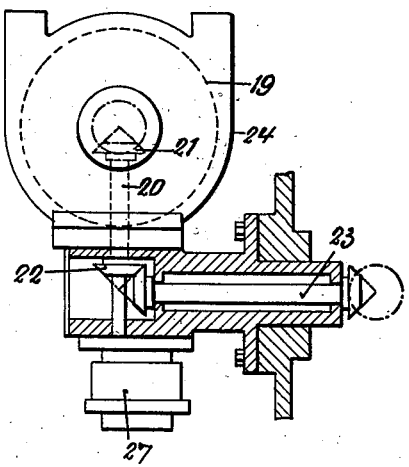
Figure 8:
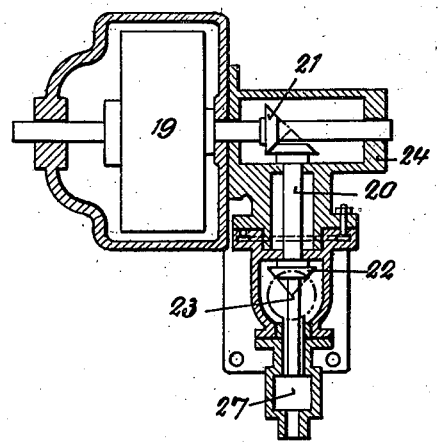

These disadvantages are overcome by the arrangement illustrated in Figs. 6–8.

The driving pulley 19 of the machine is adapted to swing about a vertical shaft 20 and drives the latter through bevels 21. The shaft 20 in turn transmits the drive through bevels 22 to the horizontal shaft 23 and thus to the machine. A casing 24 enclosing the vertical shaft 20 and the driving pulley 19, the latter being journalled therein, is also adapted to be swung about the said shaft 20. The pulley 19 may therefore be swung about the vertical shaft 20 without the drive being interrupted, the bevels 21 rolling on one another during any such swinging. The pulley may in this manner always be adjusted to be parallel to the transmission shafting whatever may be the angular position of the machine relatively to said shafting (Fig. 6). If the pulley is swung parallel to the shafting and is secured in this position the belt will run on the pulley without any twisting so that the deficiencies mentioned above will not arise.

It is clear from Fig. 6 that it is also possible in this way to economize considerably in space and to utilize substantially shorter lengths of transmission shafting. For example four machines arranged according to the present invention at an angle of inclination of 45° may be accommodated on approximately the same length 25 of shafting as was hitherto necessary for two machines arranged at an angle of 15°. The distance 26 between the machines is the same in each case. At the same time the full belt efficiency is achieved since all the belts run straight on to the pulleys. There is no objection to the machines being arranged at an even greater angle to the shafting than that illustrated.

Moreover, with this method of driving the machines, the pumps 27 for the cooling liquid may be mounted on a downward extension of the vertical shaft 20 to be driven directly thereby. Intermediate members, such as belt or chain gear, are then unnecessary. The pump is not disturbed by the swinging of the pulley 19 and, consequently, the suction and the pressure pipes mounted rigidly on the machine need not be displaced.

Having now particularly described and ascertained the nature of my said invention and in what manner the same is to be performed, I declare that what I claim is:—

1. In a multiple-spindle turret-lathe, the combination of a work holder mounted to revolve on its axis and held from longitudinal movement, an axially movable main tool slide, a plurality of work spindles mounted for rotation on their respective axes in said holder, a shaft passing centrally through said tool slide for driving said work spindles, a tubular shaft disposed about said work spindle shaft in coaxial relation thereto, and means between said tubular shaft and tool slide for imparting axial movement to said slide, the organization being such that the cutting pressure of all of the tools is absorbed by the tool slide shaft and work of any length whatever may be operated on without interference with the turret head gearing.

2. In a multiple-spindle turret-lathe, the combination of a work holder mounted to revolve on its axis and held from longitudinal movement, an axially movable main tool slide, a plurality of work spindles mounted for rotation on their respective axes in said holder, a shaft passing centrally through said tool slide for driving said work spindles, a tubular shaft disposed about said work spindle shaft in coaxial relation thereto, means between said tubular shaft and tool slide for imparting axial movement to said slide, a stop in the path of movement of the slide for limiting said axial movement, and resilient means between said slide and its moving means for permitting continued movement of the latter to a predetermined extent after the stoppage of the slide.

3. In a multiple-spindle turret-lathe, the combination of a work holder mounted to revolve on its axis and held from longitudinal movement, a plurality of lateral tool slides disposed adjacent to said holder, a rotatable ring coaxial with said work holder, guide members carried by said ring in engagement with said slides for controlling the movement thereof, each of said guide members being pivoted at one end thereof to said ring, and means for shifting the guide members on their pivots thereby to vary uniformly the amplitude of movement of the slides.

4. In a multiple-spindle turret-lathe, the combination of a main tool slide movable in axial direction, means for moving said slide, means for changing the direction of movement of the slide, a plurality of lateral tool slides, means for actuating the same, and means carried by said lateral-slide-actuating means for operating said direction-changing means.

5. In a multiple-spindle turret-lathe, driving means comprising shafts for transmitting motion to said machine, and a driving pulley mounted for swinging movement about a vertical axis for adjusting said pulley into parallel relation to said shafts.

6. In a multiple-spindle turret-lathe, driving means comprising shafts for transmitting motion to said machine, a driving pulley mounted for swinging movement about a vertical axis for adjusting said pulley into parallel relation to said shafts, and means for supplying a cooling liquid to the bearings of the machine.

In testimony whereof I have signed my name to this specification.

FRITZ POPPENSIEKER.